United States Patent
King et al.

(10) Patent No.: US 6,530,004 B1
(45) Date of Patent: Mar. 4, 2003

(54) EFFICIENT FAULT-TOLERANT PRESERVATION OF DATA INTEGRITY DURING DYNAMIC RAID DATA MIGRATION

(75) Inventors: Allen King, San Jose, CA (US); David C. W. Chiu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 09/597,972

(22) Filed: Jun. 20, 2000

(51) Int. Cl.[7] .............................................. G06F 12/02
(52) U.S. Cl. ...................................... 711/165; 711/114
(58) Field of Search ................................ 711/112, 113, 711/114, 165, 170

(56) References Cited

U.S. PATENT DOCUMENTS

| | | | |
|---|---|---|---|
| 5,392,244 A | * 2/1995 | Jacobson et al. | 365/200 |
| 5,524,204 A | * 6/1996 | Verdoorn, Jr. | 395/182.04 |
| 5,537,534 A | 7/1996 | Voight et al. | 395/182.04 |
| 5,542,065 A | 7/1996 | Burkes et al. | 395/441 |
| 5,546,558 A | * 8/1996 | Jacobson et al. | 395/441 |
| 5,551,003 A | 8/1996 | Mattson et al. | 395/463 |
| 5,572,661 A | 11/1996 | Jacobson | 395/182.05 |
| 5,574,851 A | 11/1996 | Rathunde | 395/182.05 |
| 5,615,352 A | 3/1997 | Jacobson et al. | 395/441 |
| 5,651,133 A | * 7/1997 | Burkes et al. | 395/441 |
| 5,657,468 A | 8/1997 | Stallmo et al. | 395/441 |
| 5,659,704 A | * 8/1997 | Burkes et al. | 395/441 |
| 5,664,187 A | 9/1997 | Burkes et al. | 395/621 |
| 5,666,512 A | 9/1997 | Nelson et al. | 395/441 |
| 5,758,118 A | * 5/1998 | Choy et al. | 395/441 |
| 5,875,456 A | * 2/1999 | Stallmo et al. | 711/114 |
| 5,875,457 A | 2/1999 | Shalit | 711/114 |
| 5,937,174 A | * 8/1999 | Weber | 395/309 |
| 6,052,759 A | * 4/2000 | Stallmo et al. | 711/114 |
| 6,282,619 B1 | * 8/2001 | Islam et al. | 711/165 |

* cited by examiner

Primary Examiner—Kevin L. Ellis

(57) ABSTRACT

The invention provides system, apparatus, method, and computer program for dynamically expanding a storage system, particularly a RAID (Redundant Array of Independent Disks) set based storage system, while assuring data integrity during the expansion process. In one embodiment, the invention provides a method for redistributing data in a data storage system. This embodiment of the method includes the steps of: identify data in a destructive zone of the storage system; migrating data before reaching the destructive zone from source storage devices to destination storage devices; copying data onto a number of backup buffers; mirroring data backed up in the copying step onto free space in the storage system; migrating data backed up in the mirroring step to destination storage devices; repeating the steps of migrating, copying, and mirroring, until data that will be in the destructive zone is migrated out of the destructive zone; and migrating remaining data from the source disks onto the destination disk. System, storage system controller, computer program, and computer program product utilizing the inventive method are also provided.

20 Claims, 21 Drawing Sheets

Example of a RAID 6 level disk array layout

| SG | DISK 1 | DISK 2 | DISK 3 |
|----|--------|--------|--------|
| 0  | 0      | 1      | 2      |
| 1  | 2      | 0      | 1      |
| 2  | 3      | 4      | 5      |
| 3  | 5      | 3      | 4      |
| 4  | 6      | 7      | 8      |
| 5  | 8      | 6      | 7      |

FIG. 4

Example of particular RAID 6 data migration to a RAID 5 disk array.

RAID 6 ARRAY

| SG | DISK 1 | DISK2 | DISK3 |
|----|--------|-------|-------|
| 0  | 0      | 1     | 2     |
|    | 2      | 0     | 1     |
| 1  | 3      | 4     | 5     |
|    | 5      | 3     | 4     |
| 2  | 6      | 7     | 8     |
|    | 8      | 6     | 7     |
|    |        |       |       |

→

RAID 5 ARRAY

| SG  | DISK 1 | DISK 2 | DISK 3 |    |
|-----|--------|--------|--------|----|
| 0   | P      | 0      | 1      | DZ |
| 1   | 2      | P      | 3      | DZ |
| 2   | 4      | 5      | P      | DZ |
| 3   | P      | 6      | 7      |    |
| 4   | 8      | P      | 9      |    |
| ... | ...    | ...    | ...    |    |
| ... | ...    | ...    | ...    |    |
| ... | ...    | ...    | ...    |    |
| X-4 | 0      | 1      |        | BB |
| X-3 |        | 0      | 1      | BB |
| X-2 | 2      | 3      |        | BB |
| X-1 |        | 2      | 3      | BB |

FIG. 5

Example of RAID 0 Capacity Expansion (from 3 disks to 4 disks) showing initial source configuration and final destination configuration.

| RAID 0 | | |
|---|---|---|
| DISK 1 | DISK 2 | DISK 3 |
| 0 | 1 | 2 |
| 3 | 4 | 5 |
| 6 | 7 | 8 |
| 9 | A | B |
| C | D | E |
| F | 10 | 11 |
| 12 | 13 | 14 |
| 15 | 16 | 17 |
| — | — | — |

→

| RAID 0 | | | | |
|---|---|---|---|---|
| DISK 1 | DISK 2 | DISK 3 | DISK 4 | |
| 0 | 1 | 2 | 3 | D.Z. |
| 4 | 5 | 6 | 7 | D.Z. |
| 8 | 9 | A | B | D.Z. |
| C | D | E | F | |
| 10 | 11 | 12 | 13 | |
| 14 | 15 | 16 | 17 | |
| -- | -- | -- | -- | |
| -- | -- | -- | -- | |
| -- | -- | -- | — | |

FIG. 6A

Configuration with Added Disk but before data migration.

| S.G. | RAID 0 | | | | |
|---|---|---|---|---|---|
| | DISK1 | DISK2 | DISK3 | DISK4 | |
| 0 | 0 | 1 | 2 | free | D.Z. |
| 1 | 3 | 4 | 5 | free | D.Z. |
| 2 | 6 | 7 | 8 | free | D.Z. |
| 3 | 9 | A | B | free | |
| 4 | C | D | E | free | |
| 5 | F | 10 | 11 | free | |
| 6 | 12 | 13 | 14 | free | |
| --- | --- | --- | --- | free | |
| $M^{th}$ | n-2 | n-1 | n | free | |
| --- | --- | --- | --- | free | |
| X-2 | | | | free | B.B. |
| X-1 | | | | free | B.B. |

FIG. 6B

Copy stripes that will form first stripe group in Destination Zone to Backup Buffer.

| S.G. | RAID 0 | | | | |
|---|---|---|---|---|---|
| | DISK1 | DISK2 | DISK3 | DISK4 | |
| 0 | 0 | 1 | 2 | | D.Z. |
| 1 | 3 | 4 | 5 | | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| M$^{th}$ | n-2 | n-1 | n | | |
| --- | --- | --- | --- | | |
| X-2 | 0 | 1 | 2 | 3 | B.B. |
| X-1 | | | | | B.B. |

FIG. 6C

Mirror Copy to Second Region in Backup Buffer

| S.G. | RAID 0 | | | | |
|---|---|---|---|---|---|
| | DISK1 | DISK2 | DISK3 | DISK4 | |
| 0 | 0 | 1 | 2 | | D.Z. |
| 1 | 3 | 4 | 5 | | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| M$^{th}$ | n-2 | n-1 | n | | |
| --- | --- | --- | --- | | |
| X-2 | 0 | 1 | 2 | 3 | B.B. |
| X-1 | 3 | 0 | 1 | 2 | B.B. |

FIG. 6D

Migrate Data from source to First Stripe Group (S.G. 0) of Destination

| S.G. | RAID 0 | | | | |
|---|---|---|---|---|---|
| | DISK1 | DISK2 | DISK3 | DISK4 | |
| 0 | 0 | 1 | 2 | 3 | |
| 1 | 3 | 4 | 5 | | D.Z. |
| 2 | 6 | 7 | 8 | | D.Z. |
| 3 | 9 | A | B | | D.Z. |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | 0 | 1 | 2 | 3 | B.B. |
| X-1 | 3 | 0 | 1 | 2 | B.B. |

FIG. 6E

Copy stripes that will form second stripe group in Destination Destruction Zone to Backup Buffer.

| S.G. | RAID 0 | | | | |
|---|---|---|---|---|---|
| | DISK1 | DISK2 | DISK3 | DISK4 | |
| 0 | 0 | 1 | 2 | 3 | |
| 1 | 3 | 4 | 5 | | D.Z. |
| 2 | 6 | 7 | 8 | | D.Z. |
| 3 | 9 | A | B | | D.Z. |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | 4 | 5 | 6 | 7 | B.B. |
| X-1 | 3 | 0 | 1 | 2 | B.B. |

FIG. 6F

Mirror Operation

| S.G. | RAID 0 | | | | |
|---|---|---|---|---|---|
| | DISK1 | DISK2 | DISK3 | DISK4 | |
| 0 | 0 | 1 | 2 | 3 | D.Z. |
| 1 | 3 | 4 | 5 | | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | *4* | *5* | *6* | *7* | B.B. |
| X-1 | *7* | *4* | *5* | *6* | B.B. |

FIG. 6G

Migrate Second Stripe Group (Stripe Group 1) to Destination.

| S.G. | RAID 0 | | | | |
|---|---|---|---|---|---|
| | DISK1 | DISK2 | DISK3 | DISK4 | |
| 0 | 0 | 1 | 2 | 3 | D.Z. |
| 1 | 4 | 5 | 6 | 7 | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | *4* | *5* | *6* | *7* | B.B. |
| X-1 | *7* | *4* | *5* | *6* | B.B. |

FIG. 6H

Copy Third Stripe Group (Stripe Group 2) to Destination.

| S.G. | RAID 0 | | | | |
|---|---|---|---|---|---|
| | DISK1 | DISK2 | DISK3 | DISK4 | |
| 0 | 0 | 1 | 2 | 3 | D.Z. |
| 1 | 4 | 5 | 6 | 7 | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | 8 | 9 | A | B | B.B. |
| X-1 | 7 | 4 | 5 | 6 | B.B. |

FIG. 6I

Mirror Third Stripe Group (Stripe Group 2) to Destination.

| S.G. | RAID 0 | | | | |
|---|---|---|---|---|---|
| | DISK1 | DISK2 | DISK3 | DISK4 | |
| 0 | 0 | 1 | 2 | 3 | D.Z. |
| 1 | 4 | 5 | 6 | 7 | D.Z. |
| 2 | 6 | 7 | 8 | | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | 8 | 9 | A | B | B.B. |
| X-1 | B | 8 | 9 | A | B.B. |

FIG. 6J

Migrate Third Stripe Group (Stripe Group 2) to Destination.

| S.G. | RAID 0 | | | | |
|---|---|---|---|---|---|
|  | DISK1 | DISK2 | DISK3 | DISK4 | |
| 0 | 0 | 1 | 2 | 3 | D.Z. |
| 1 | 4 | 5 | 6 | 7 | D.Z. |
| 2 | 8 | 9 | A | B | D.Z. |
| 3 | 9 | A | B | | |
| 4 | C | D | E | | |
| 5 | F | 10 | 11 | | |
| 6 | 12 | 13 | 14 | | |
| --- | --- | --- | --- | | |
| $M^{th}$ | n-2 | n-1 | n | | |
| --- | --- | --- | — | | |
| X-2 | *8* | *9* | *A* | *B* | B.B. |
| X-1 | *B* | *8* | *9* | *A* | B.B. |

FIG. 6K

Read Fourth Stripe Group (not in D.Z.) and Write to Destination

| S.G. | RAID 0 | | | | |
|---|---|---|---|---|---|
|  | DISK1 | DISK2 | DISK3 | DISK4 | |
| 0 | 0 | 1 | 2 | 3 | D.Z. |
| 1 | 4 | 5 | 6 | 7 | D.Z. |
| 2 | 8 | 9 | A | B | D.Z. |
| 3 | C | D | E | F | |
| 4 | C | D | E | | |
| 5 | *F* | 10 | 11 | | |
| 6 | 12 | 13 | 14 | | |
| --- | --- | --- | --- | | |
| $M^{th}$ | n-2 | n-1 | n | | |
| --- | --- | --- | --- | | |
| X-2 | *n.a.* | *n.a.* | *n.a.* | *n.a.* | B.B. |
| X-1 | *n.a.* | *n.a.* | *n.a.* | *n.a.* | B.B. |

FIG. 6L

Read final (n=6) Stripe Group (not in D.Z.) and Write to Destination

| S.G. | RAID 0 | | | | |
|---|---|---|---|---|---|
| | DISK1 | DISK2 | DISK3 | DISK4 | |
| 0 | 0 | 1 | 2 | 3 | D.Z. |
| 1 | 4 | 5 | 6 | 7 | D.Z. |
| 2 | 8 | 9 | A | B | D.Z. |
| 3 | C | D | E | F | |
| 4 | 10 | 11 | 12 | 13 | |
| 5 | 14 | 15 | 16 | 17 | |
| 6 | 18 | 19 | 1A | 1B | |
| --- | --- | --- | --- | | |
| $M^{th}$ | n-2 | n-1 | n | | |
| --- | --- | --- | --- | | |
| X-2 | *n.a.* | *n.a.* | *n.a.* | *n.a.* | B.B. |
| X-1 | *n.a.* | *n.a.* | *n.a.* | *n.a.* | B.B. |

FIG. 6M

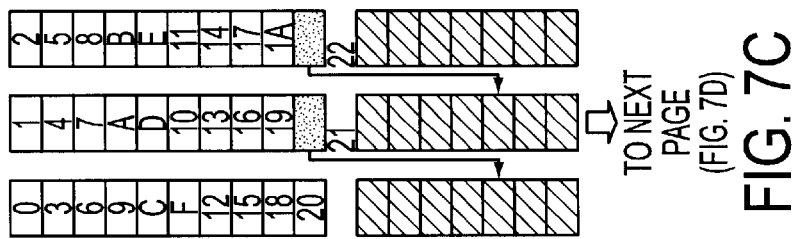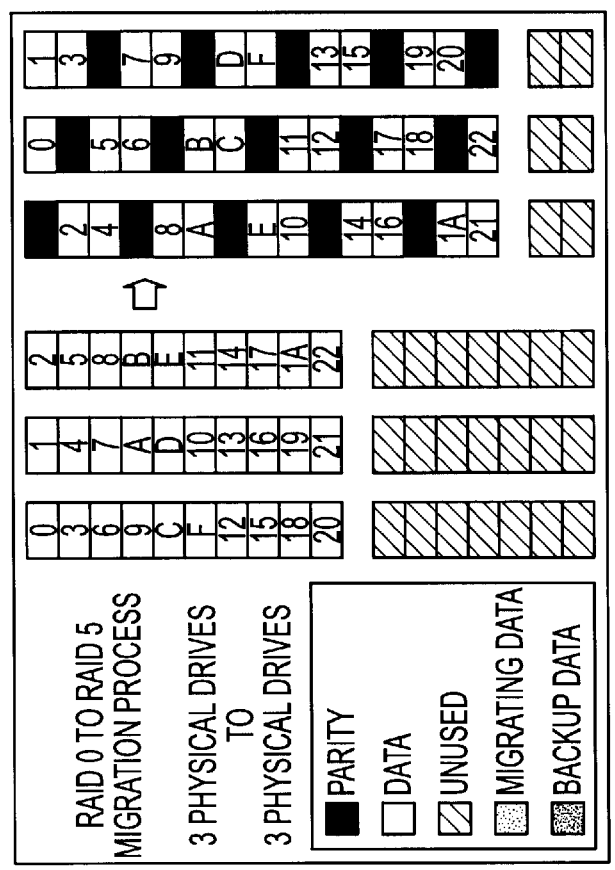
FIG. 7A    FIG. 7B    FIG. 7C

TO NEXT PAGE (FIG. 7H)

TO NEXT PAGE (FIG. 7P)

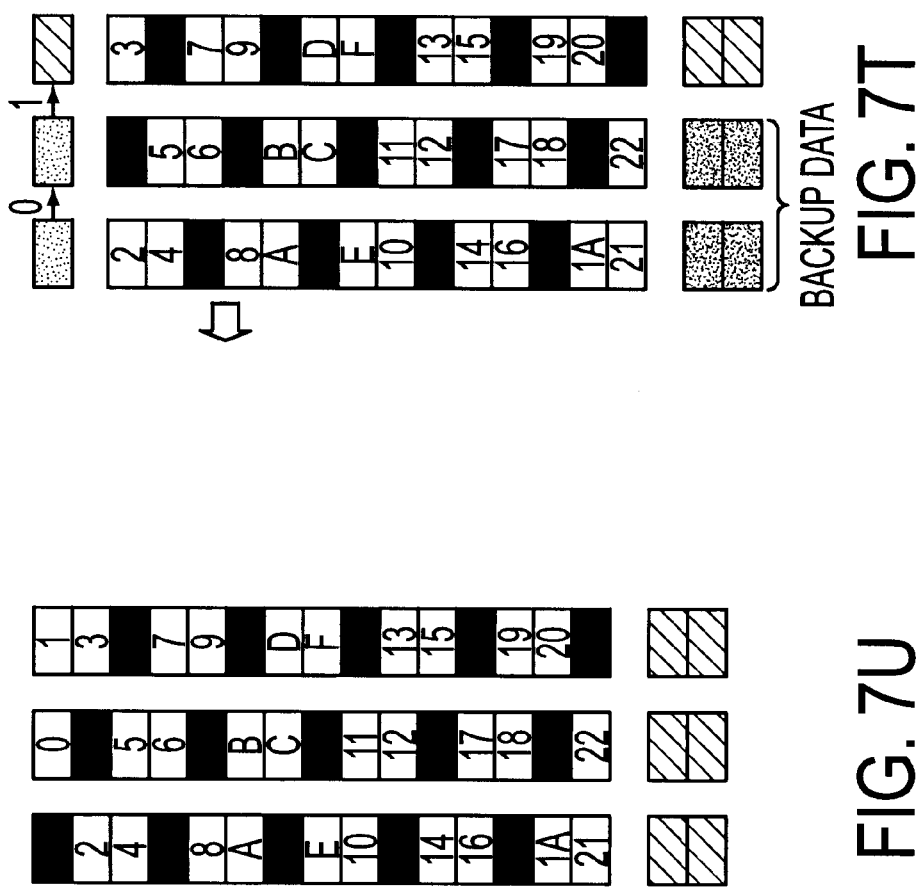

Example 3- RAID 0 (3 disks) changed to RAID 5 (5 disks)

Initial configuration after adding two new disks but prior to data migration.

| S.G. | RAID 5 | | | | | |
|---|---|---|---|---|---|---|
| | DISK1 | DISK2 | DISK3 | DISK4 | DISK5 | |
| 0 | 0 | 1 | 2 | | | D.Z. |
| 1 | 3 | 4 | 5 | | | D.Z. |
| 2 | 6 | 7 | 8 | | | D.Z. |
| 3 | 9 | A | B | | | |
| 4 | C | D | E | | | |
| 5 | F | 10 | 11 | | | |
| | 12 | 13 | 14 | | | |
| | | | | | | |

Final Configuration after data migration.

| S.G. | RAID 5 | | | | | |
|---|---|---|---|---|---|---|
| | DISK1 | DISK2 | DISK3 | DISK4 | DISK5 | |
| 0 | P | 0 | 1 | 2 | 3 | D.Z. |
| 1 | 4 | P | 5 | 6 | 7 | D.Z. |
| 2 | 8 | 9 | P | A | B | D.Z. |
| 3 | C | D | E | P | F | |
| 4 | 10 | 11 | 12 | 13 | P | |
| 5 | -- | -- | -- | -- | -- | |
| | | | | | | |
| | | | | | | |

FIG. 8C

RAID 5 (3 disks) changed to RAID 6 (3 disks)

| RAID 5 | | |
|---|---|---|
| DISK1 | DISK2 | DISK3 |
| P | 0 | 1 |
| 2 | P | 3 |
| 4 | 5 | P |
| P | 6 | 7 |
| 8 | P | 9 |
| A | B | P |
| P | C | D |
| E | P | F |
| 10 | 11 | P |
| --- | --- | --- |
| | | |

→

| RAID 6 | | | |
|---|---|---|---|
| DISK1 | DISK2 | DISK3 | |
| 0 | 1 | 2 | D.Z. |
| 2 | 0 | 1 | D.Z. |
| 3 | 4 | 5 | D.Z. |
| 5 | 3 | 4 | D.Z. |
| 6 | 7 | 8 | D.Z. |
| 8 | 6 | 7 | D.Z. |
| 9 | A | B | |
| B | 9 | A | |
| C | D | E | |
| E | C | D | |
| --- | --- | --- | |

FIG. 9A

Initial Configuration.

| S.G. | RAID 5 | | |
|---|---|---|---|
| | DISK1 | DISK2 | DISK3 |
| 0 | P | 0 | 1 |
| 1 | 2 | P | 3 |
| 2 | 4 | 5 | P |
| 3 | P | 6 | 7 |
| 4 | 8 | P | 9 |
| 5 | A | B | P |
| 6 | P | C | D |
| 7 | E | P | F |
| 8 | 10 | 11 | P |
| 9 | --- | --- | --- |
| | | | |

FIG. 9B

Final configuration

| S.G. | RAID 6 | | | |
|---|---|---|---|---|
| | DISK1 | DISK2 | DISK3 | |
| 0 | 0 | 1 | 2 | D.Z. |
| 1 | 2 | 0 | 1 | D.Z. |
| 2 | 3 | 4 | 5 | D.Z. |
| 3 | 5 | 3 | 4 | D.Z. |
| 4 | 6 | 7 | 8 | D.Z. |
| 5 | 8 | 6 | 7 | D.Z. |
| 6 | 9 | A | B | |
| 7 | B | 9 | A | |
| 8 | C | D | E | |
| 9 | E | C | D | |
| | --- | --- | --- | |

FIG. 9C

FIG. 10C. Final Configuration.

EFFICIENT FAULT-TOLERANT PRESERVATION OF DATA INTEGRITY DURING DYNAMIC RAID DATA MIGRATION

FIELD OF THE INVENTION

The present invention relates generally to distributed computing systems, and more particularly to an apparatus, method, and computer program for dynamically expanding a RAID (Redundant Array of Independent Disks) set while assuring data integrity during the expansion process.

BACKGROUND

In a distributed computing system, such as for example a computing system having a plurality of computers (host computer(s) and/or workstation computer(s)) connected over a network, a host computer is connected to a storage (memory) system via a storage controller. The host communicates with the storage controller through an interface, such as for example, a small computer systems interface (SCSI), a Fibre Channel interface, or other interface as are known in the art. RAID technology is frequently employed to provide data redundancy for distributed computing systems.

In a RAID architecture system, the host communicates to a RAID storage controller via an interface. In turn, the RAID storage controller is connected to one or more storage elements (i.e., the RAID set, which may include for example, hard disk drives, optical disks, magneto-optical disks, solid state storage devices, CD-ROM disks, DVD disks, magnetic tape drives, or other storage media as are known in the art) for storing host data. The host writes to, or reads from, the storage elements through the RAID storage controller. The RAID storage controller writes data to the various storage elements according to the user's selected RAID level or scheme providing the user a selectable level of redundancy for host data. Various RAID levels or schemes are known in the art.

In some systems the number of storage elements for storing the host data is variable. That is, the number of storage elements is dependent on the amount of information required to be stored. Furthermore, in general, each of the RAID levels may be implemented with a variable number of storage elements, although in some cases, a relationship exists between the RAID level and the number of drives as is known in the art. Accordingly, for some systems, expansion (dynamic expansion) to add one or more storage elements to the existing RAID set is required as host storage requirements increase.

One problem that has arisen during RAID set expansion is maintaining data integrity for the system in the event of a power failure during the expansion process. While ordinarily data integrity is high in a RAID because of the redundancy built into the RAID architecture system, during the expansion process, a power failure may result in data loss.

Another problem that has arisen with conventional systems and methods is that the data migration is only performed for dynamic expansion of physical capacity of the existing RAID level and does not involve a change in RAID level or redundancy. That is, the dynamic expansion is performed by adding at least one additional storage element, typically by adding at least one additional disk, and the RAID level or redundancy of the expanded configuration is the same as the RAID level or redundancy of the configuration before expansion.

Conventional approaches for backing up data that is stored in a destructive zone during data migration depends on the existence of additional disks into which RAID expands its physical capacity. In general terms, the destructive zone is the number of data stripes which are being migrated into the destination array, one or more of them is liable to suffer data loss in the event of a power loss, because source data stripes are being overwritten as a result of the data migration. In such a power loss situation, when the power is restored, if the source data is no longer completely available for re-migration, the affected stripes have lost data.

For ease of implementation and preservation of data integrity, whole stripe groups containing said susceptible stripes are viewed by the destination array as part of the destructive zone.

In conventional approaches, data in the destructive zone is backed up onto the last added disk before data migration starts. For any data migration that does not involve additional disk, the traditional approach does not work, because such data migration relies on the availability of the unused storage of the last added disk drive.

With reference to FIG. 1, the conventional system 101 and approach for a RAID data migration involves N disks 102 (102-1, . . . , 102-N) with at least one additional disk 102-N+1 for expansion, and where all data in the destructive zone is backed up before data migration (dynamic RAID capacity expansion only). In the case of adding 1 disk to such system, M=N+1. In the referenced figures, the notation the Backup Buffer (B.B.) is used to refer to the area of disk 102-M that contains or stores a copy of all data stripes in the destructive zone (D.Z.) before data migration for the stripe groups starts. In a simple sense, the destructive zone spans an amount of storage that would or might be overwritten by data during migration of the data from the original (source) storage configuration to the new (destination) storage configuration which is susceptible to power loss before its migration is complete. The disk drives 102 are coupled to a host computer 104 via a disk controller 106 as is known in the art.

Data migration using such a traditional approach does not address a change in RAID redundancy (level). Therefore, even if there is a need for RAID capacity expansion, which means additional disks are available for data migration, the traditional approach cannot be applied if such RAID level change is involved.

What is desired is to provide for dynamic expansion capability in terms of capacity and/or redundancy while maintaining host data integrity, and to permit the dynamic expansion with a change in RAID level when desired, without compromising data integrity.

SUMMARY

The invention provides system, apparatus, method, and computer program for dynamically expanding a storage system, particularly a RAID (Redundant Array of Independent Disks) set based storage system, while assuring data integrity during the expansion process.

In one embodiment, the invention provides a method for redistributing data in a data storage system. This embodiment of the method includes the steps of: identify data in a destructive zone of the storage system; migrating data before reaching the destructive zone from source storage devices to destination storage devices; copying data onto a number of backup buffers; mirroring data backed up in the copying step onto free space in the storage system; migrating data backed up in the mirroring step to destination storage devices;

repeating the steps of migrating, copying, and mirroring, until data that will be in the destructive zone is migrated out of the destructive zone; and migrating remaining data from the source disks onto the destination disks.

In another embodiment, the method for redistributing data among disks in a data storage system includes the steps of: identifying the number of stripe groups in a destructive zone based on predefined factors; migrating all data before reaching the destructive zone from source disks to destination disks; copying all data that will be next to be in the stripe group of the destructive zone onto an equal number of backup buffer stripe buffers, each stripe using free space near the end of the physical volume of each disk; mirroring data stripes backed up in the copying all data step onto the same set of disks in the lower stripe group position of free space in the storage system; migrating data of the stripe group backed up in the mirroring step to destination disks from the source disks; repeating the steps of migrating, copying, and mirroring, until all data that will be in stripe groups in the destructive zone is migrated out of the destructive zone; and migrating all remaining data, if any, from the source disks onto the destination disks.

System, storage system controller, computer program, and computer program product utilizing the inventive method are also provided.

BRIEF DESCRIPTION OF THE DRAWINGS

FIG. 4 is an illustration showing an exemplary RAID 6 disk drive array layout.

FIG. 5 is an illustration showing aspects of an exemplary RAID 6 to RAID 5 data migration.

FIGS. 6A–6M is an illustration showing aspects of an exemplary RAID 0 three-disk to four-disk capacity expansion.

FIGS. 8A–8C is a illustration showing aspects of a three-disk RAID 0 to five-disk RAID 5 migration.

FIGS. 9A–9C is a illustration showing aspects of a three-disk RAID 5 to three-disk RAID 6 migration.

DETAILED DESCRIPTION OF EMBODIMENTS OF THE INVENTION

In the most general case, data migration of a logical drive utilizing a RAID may involve: (i) RAID physical capacity expansion without a change in RAID level; (ii) RAID redundancy level changes only without any capacity expansion; and/or (iii) RAID physical capacity expansion with a change in RAID level. The above described known conventional approach only provides a possible solution for (i) RAID physical capacity expansion without a change in RAID level or redundancy.

Recall that even for mere capacity expansion, conventional approaches depend on the existence of additional disks into which the RAID expands its physical capacity, and in such approaches, data in the destructive zone is backed up onto the last added disk before data migration starts. The inventive structure and method does not require any added drives or other storage elements.

The RAID controller determines the destructive zone end boundary beginning from the very first stripe group (or any succeeding stripe group) of the underlying logical drive, regardless of the type of data migration involved, that is independent of whether the direction of data movement from the source to the destination is forward (top down, or the first stripe first), or backward (bottom up, or the last stripe first). The phrase underlying logical drive refers to the volume of data accessible to the host system which is evenly striped across an array (also known as physical pack) of individual disks that are logically tied to each other and addressed as a single unit. All the disks in the array are desirably of the same capacity; otherwise, each disk therein will effectively have the capacity of the smallest member.

Figure 1:
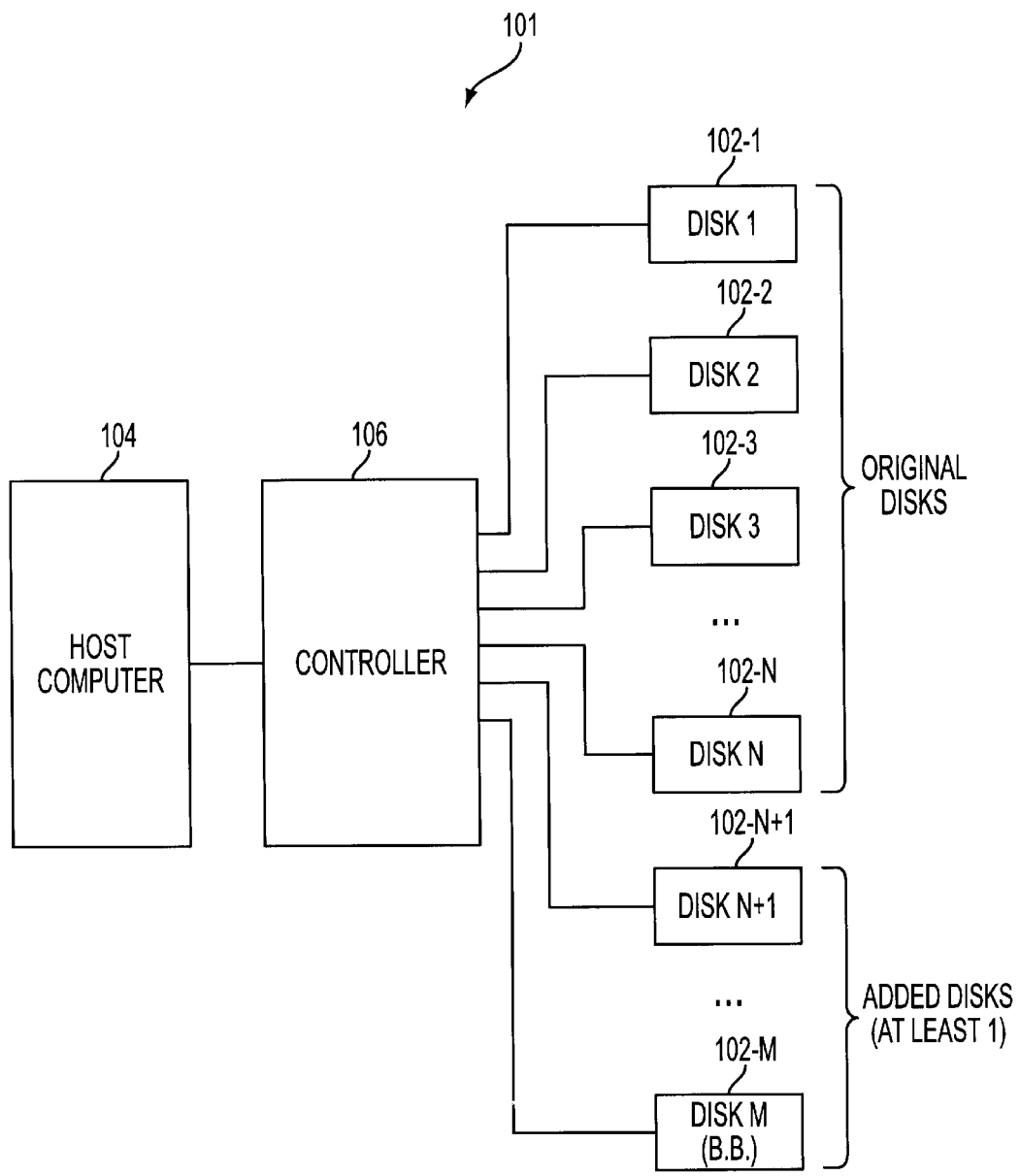
FIG. 1 is a schematic block diagram of a first RAID architecture distributed computing system.
Figure 2:
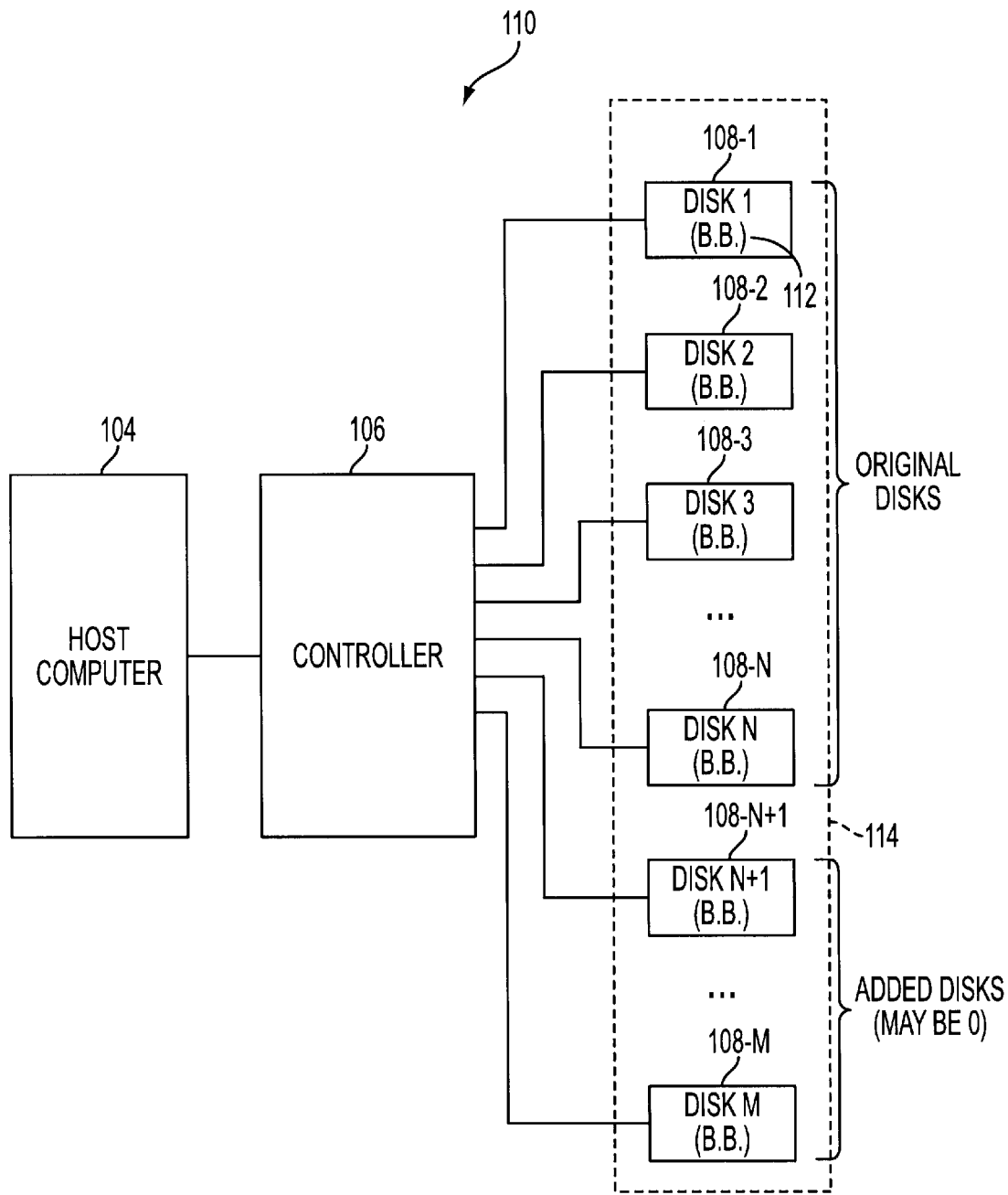
FIG. 2 is a schematic block diagram of a RAID architecture distributed computing system, according to one embodiment of the present invention.

With reference to FIG. 2, wherein is illustrated a block diagram of a RAID architecture distributed computing system 110, according to one embodiment of the present invention, particularly illustrating the locations of the backup buffers (BB) 112 distributed among the original set of disk drives 108 or other storage devices and the manner in which additional disks (or other storage devices) may optionally be added, or where the storage system 114 may merely be reconfigured to a different storage configuration without adding additional disk drives or storage devices. Unlike conventional approaches, the inventive system and method do not require any additional disks to migrate data. In the figure, the notation the Backup Buffer (B.B.) is used to contain or store a copy of data stripes in the destructive zone (D.Z.) one or more stripe groups at a time before data migration for the stripe groups begins. The destructive zone spans an amount of storage that would or might be overwritten by data during migration of the data from the original (source) storage configuration to the new (destination) storage configuration which is susceptible to power loss before its migration is complete. Data migration using the inventive approach permits a change in RAID redundancy or level. Therefore, even if there is a need for RAID capacity expansion, which means additional disks are available for data migration, the traditional approach cannot be applied if such RAID level change is involved.

Figure 3:
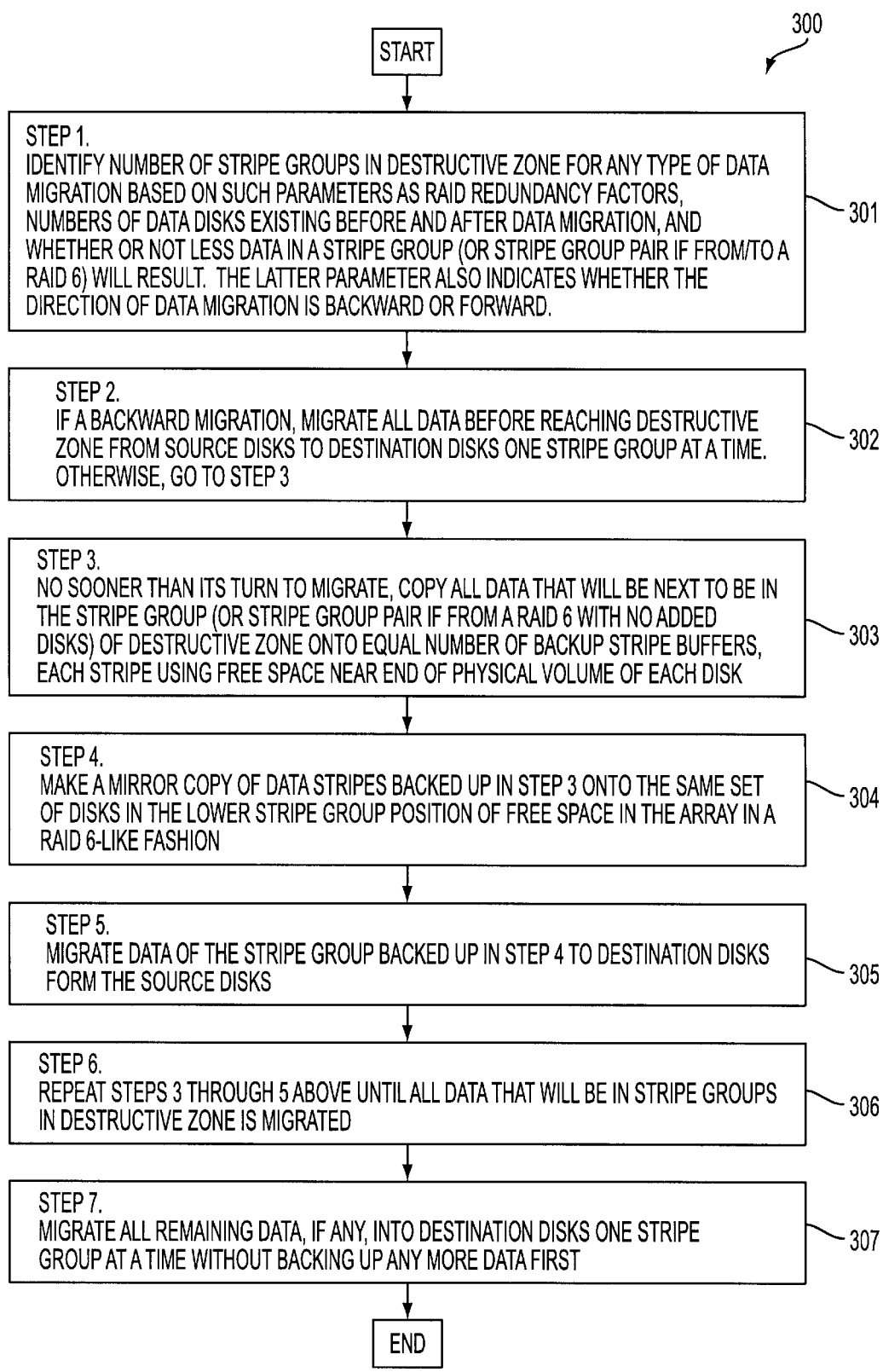
FIG. 3 is a diagrammatic flow-chart that illustrates aspects of an exemplary procedure, according to one embodiment of the present invention.
Figure 7D:
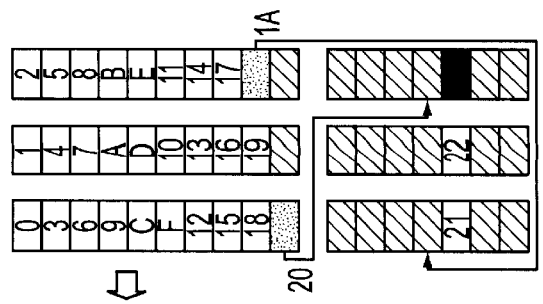
FIGS. 7A–7T is an illustration showing aspects of an exemplary RAID 0 to RAID 5 three-disk to three-disk data migration process.
Figure 7E:
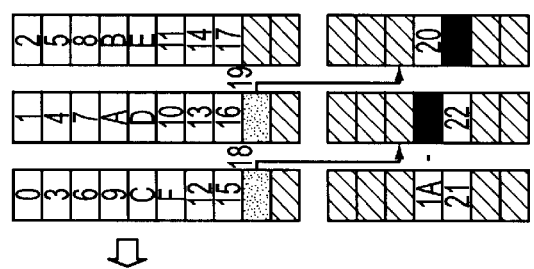
Figure 7F:
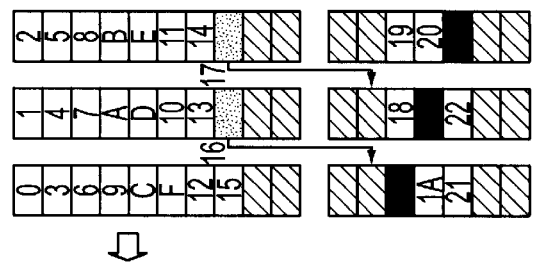
Figure 7G:
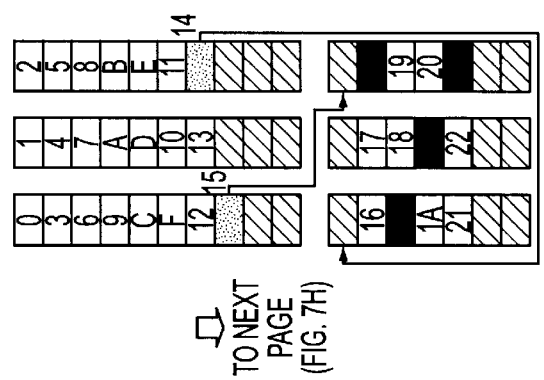
Figure 7K:
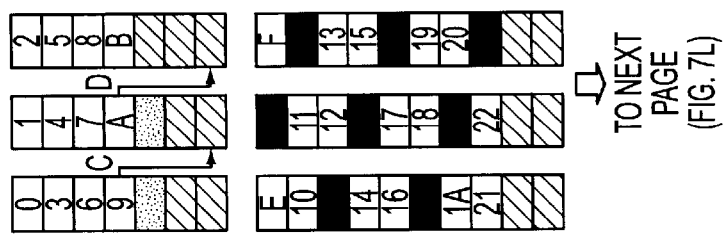
Figure 7J:
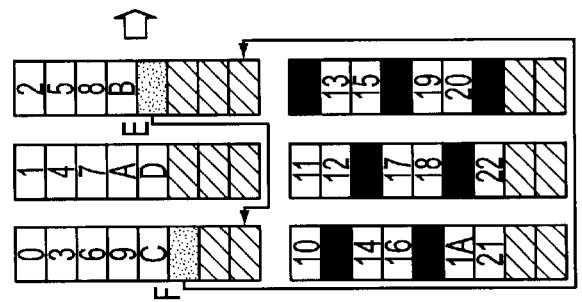
Figure 7I:
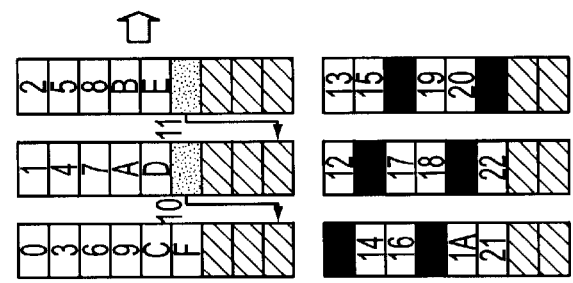
Figure 7H:
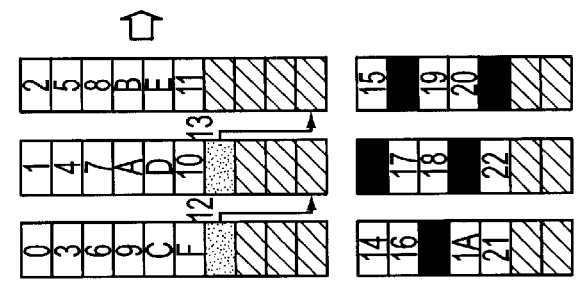
Figure 7L:
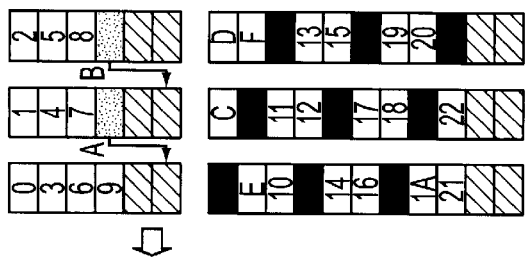
Figure 7M:
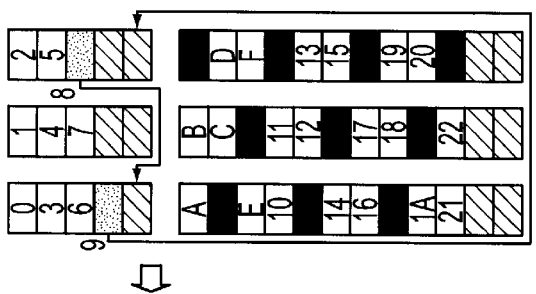
Figure 7N:
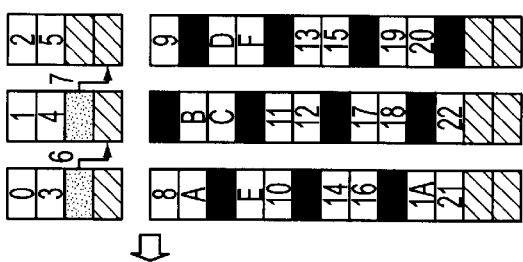
Figure 7O:
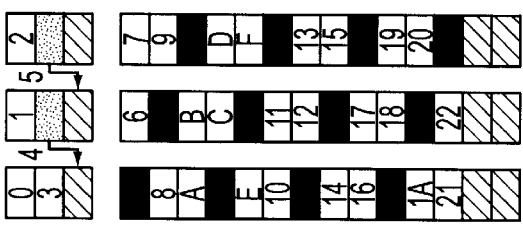
Figure 7S:
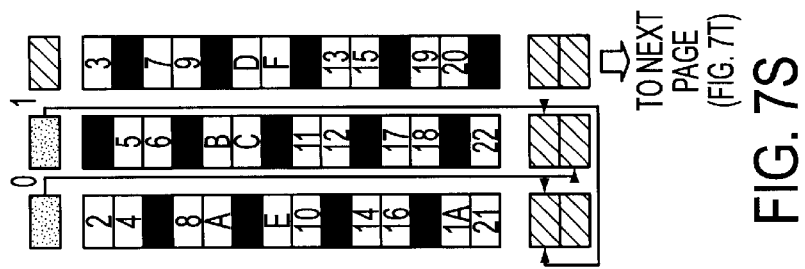
Figure 7R:
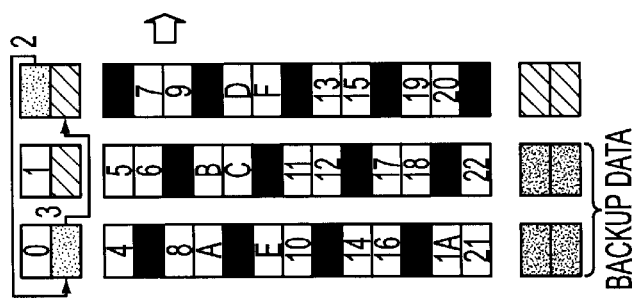
Figure 7Q:
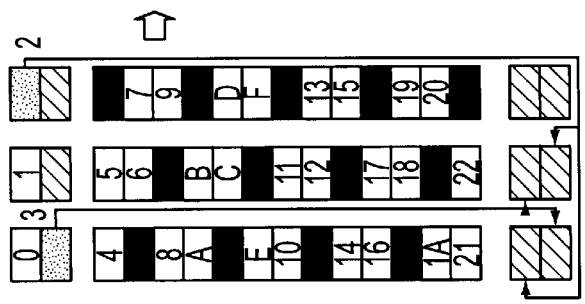
Figure 7P:
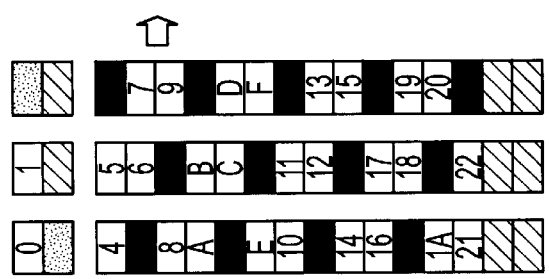

With reference to the flow-chart illustration of FIG. 3, we now describe one embodiment of the inventive data migration procedure 300.

Identify the number of stripe groups in the destructive zone for any type of data migration based on predefined factors (Step 301). Such predefined factors may include for example, the RAID redundancy factor in terms of data copy count before and after the data migration, the number of data disks existing before and after data migration, and whether or not less data in a stripe group will result from the migration (step 301). The factors may also specify that the data migration is to proceed in a forward or reverse (backward) direction. Note that if the source or destination is a RAID 6 array, data amount in a pair of stripe groups is measured.

If it is determined that less data in a stripe group (or a stripe group pair if a RAID 6 configuration is involved) will result, a backward data migration will start from the last stripe (bearing the highest stripe number) of the logical drive upward one stripe group at a time until the destructive zone is reached. Otherwise, data migration will be conducted in a forward direction from the first strip (bearing the lowest stripe number) of the logical drive downward through the destructive zone of the destination array.

Before migration of data in the appropriate direction into the next stripe group (or stripe group pair if from a RAID 6 with no additional disk) that will be in the destructive zone of the destination array, such data is copied onto an equal number of backup stripe buffers, each using free space near the end of the physical volume of the available disks (Step 302). In this context, available disks refer to all disks used by the destination array, which may be the same as the original disks (that is no additional disks added) or a larger number of disk drives. The free space need only be sufficient to permit up to four stripe groups of data at maximum.

Next, a mirror copy of the data stripes that were backed up (See Step 303) is made on the same set of disks, preferably in the next to last stripe spaces (however other spaces may be used), that is at (or near) the end of volume of each physical disk of the destination array, in a RAID 6 manner (Step 304). Copying near the end of the volume maximizes the capacity of the drive among other advantages. RAID 6 here refers to a RAID figuration wherein data in a RAID 0-like array is cross mirrored on the adjacent disks for each stripe group. See FIG. 4 for a small RAID 6 data layout using three physical disks 1, 2 and 3.

Next, data so backed up is migrated from the source disks to destination disks one stripe group at a time (Step 305). Steps 303 through 305 are repeated until all the stripe groups in the destructive zone are migrated (Step 306).

Finally, all the remaining stripe groups, if any (in the case that more data is predetermined to result), are migrated from source disks to destination disks one stripe group at a time until all data is migrated (Step 307).

Having described one embodiment of the inventive method, we now digress to address the exception that may occur when data stripes in a destructive zones are backed up and mirrored. Typically, this occurs using available disks one stripe group at a time before the stripe group is migrated. However, exceptions exist, for example, when a RAID 6 configuration goes through a migration to a RAID 5 configuration without additional disks, two stripe groups in the destructive zone (rather than one) are backed up before the data is migrated. This situation is described relative to FIG. 5. The RAID 6 stripe group 0 (stripes numbered 0, 1 and 2) is overwritten when those stripes are migrated into the destination RAID 5 array (resulting in stripes designated as P, 0, and 1), wherein "P" represents parity information. In this example, RAID 6 stripe 2 will be unavailable for re-migration if there is a power cycle.

It is only necessary to provide enough disk space located beginning in the last stripe group of the destination array (designated as X–1), therefore no added disk drives are required under the inventive approach.

Having described the overall method, we now describe some particular aspects of destructive zone boundary and sizing for each of three scenarios or cases, referenced the possible three values of a factor called Delta, where Delta is the measure of the resultant data amount changes, which can decrease or increase in value, or remain the same. Delta is equal to the Destination Data Disk Count (NDD) multiplied by the Source Data Copy Count (Cs) minus the Source Data Disk Count (NSD) multiplied by the Destination Data Copy Count (Cd), or in mathematical terms:

$$\text{Delta} = (N_{DD} \times C_S) - (N_{SD} \times C_D) \quad \text{(EQ. 1)}$$

where:
- $N_{DD}$=Destination Data Disk Count,
- $C_S$=Source Data Copy Count,
- $N_{SD}$=Source Data Disk Count, and
- $C_D$=Destination Data Copy Count.

The data copy counts for arrays such as RAID 0, RAID 1, RAID 5 and RAID 6 are 1, 2, 1 and 2, respectively. RAID 1 and RAID 6 have mirrored data. It is noted that, in some circumstances, the above equations refer to the number of "data" disks which may differ from the total number of disks by one (or more), because of the use of one (or more) disk's-worth of space for parity. In the case of a RAID 5 configuration the difference will be one disk.

For the first case (Case I) when Delta is greater than zero (positive Delta), that is when more data is a stripe group (or a stripe group pair if a RAID 6 is involved) results from the migration, the Destructive Zone (in stripe groups) is equal to the Source Data Disk Count divided by the absolute value of Delta divided by the source Data Copy Count, or in mathematical terms:

$$\text{Destructive Zone} = \text{Source Data Disk Count} \div \left| \frac{\text{Delta}}{\text{SourceDataCopyCount}} \right| \quad \text{(EQ. 2)}$$

The reason the Source Data Copy Count is part of the equation, is to accommodate RAID capacity expansion and some cases on RAID 6 to RAID 5 migration without additional disks.

Source Data Copy Count is not part of the Destructive Zone formula when Delta is negative because it is not needed. One reason may be that the destination disk count tends to be larger because of the RAID expansion. It is observed that when the value of Delta is negative and the destination array is smaller in size, the destructive zone calculation needs to be similarly changed as follows:

$$\text{Destructive Zone} = \text{Destination Disk Count} \div \left| \frac{\text{Delta}}{\text{DestinationCopyCount}} \right|. \quad \text{(EQ. 3)}$$

In simple terms, delta will be positive when more data is contained in the destination stripe group (or stripe group pair). This means that the direction of data migration can be forward. Typical Case I scenarios that would be encountered in fielded systems include, but are not limited to: array capacity expansion without RAID level change, RAID level change with an appropriate number of additional disks, or RAID 6 migration to RAID 5 without additional disks.

For the second case (Case II) when Delta is less than zero, that is when less data in a stripe group (or a stripe group pair if a RAID 6 is involved), will result in the Destructive Zone (in stripe groups) is equal to the Destination Data Disk Count divided by the absolute value of Delta, or in mathematical terms:

$$\text{Destructive Zone} = \text{Destination Data Disk Count} \div |\text{Delta}|. \quad \text{(EQ. 4)}$$

Notice that in this case the destructive zone is based on the destination data disk count rather than on the source data disk count as in Case I. This means that the size of destructive zone is a function of the set of disks that contain less data in its stripe group than its counterpart. When Delta is less than zero, the data migration is advantageously carried out in backward (from the bottom to the top) order, that is, the last stripe is migrated first toward the destructive zone, which will be entered last. To explain the concept, assume we go top down. Then, the lower numbered stripes will overlay the higher numbered stripes in the source disks, making migration of following stripe groups impossible. Therefore, the migration is performed from the bottom up. See RAID 0 to RAID 5 migration charts illustrated below.

Typical Case II scenarios include, but are not limited, for example, to: RAID level changes without any additional disks like RAID 0 to RAID 1, RAID 0 to RAID 5 or RAID 6, or RAID 5 to RAID 6, or without sufficient additional disks like RAID 0 to RAID 6 with only 1 added disk.

For the Third case (Case III) when Delta is equal to zero, that is when resultant data in the stripe group of the destination amounts to the same as the source stripe group, Destructive Zone (in stripe groups) includes all stripe groups of the entire logical drive, or in mathematical terms:

Destructive Zone=All stripe groups in the logical drive   (EQ. 5)

This is handled by a procedure in which: one stripe group is copied onto the backup buffer (steps 303–304) and then migrate that stripe from source to destination (step 305). Then these steps are repeated (step 306).

This means that the direction of data migration is forward and before migrating any stripe group, the data must be backed up first for every stripe group in the logical drive. Typical Case III scenarios include, but are not limited to: RAID 0 (N DISKS) to RAID 5 (N+1 DISK), RAID 5 (N DISKS) to RAID 6 ((N+1)×2 DISKS).

In each of the above relationships for determining the destructive zone size, a fractional number is rounded up to a whole number. For example, if the number of stripes in a destructive zone is computed to be 2½, then this is rounded up to be 3. Rounding up is used so that in the case of a five-disk RAID 6 is expanded to a seven-disk RAID 6. For example, three stripe groups should be in the destructive zone, even though the computed value is 2½. Although in some cases, rounding up is not necessary, it is safe and harmless to do so. For a RAID 6 destination array, the destructive zone consists of "y" stripe group pairs, where y is the result of the formula referred to earlier.

The inventive structure and method have several advantages over conventional structure and methods. First, the inventive procedure used to calculate the destructive zone size is simple and generally yields the minimum size in terms of stripe groups to be backed up which has the further benefit of minimizing any extra delay that would otherwise be incurred during the dynamic RAID data migration to allow preservation of data integrity.

It will therefore be appreciated that the general procedure for transforming a first RAID configuration to a second RAID configuration, where the first and second RAID configurations may have the same or different RAID level and/or the same or different numbers of disks, may be summarized as follows:

Pursuant to the data migration procedure 300 described above relative to the flowchart diagram in FIG. 3, the procedure first identifies the number of stripe groups in the destructive zone (Step 301) for any type of data migration based on selected parameters, for example, based on RAID redundancy factors and the number of data disks existing in the configuration before the data migration and after the data migration, and whether less data stripes will result. If yes, a backward data migration will start and continue up to the destructive zone (Step 302). Next, data stripes are copied in the next stripe group of the destructive zone onto an equal number of stripe backup buffers, each using free space near the end of the physical volume of the available disks (Step 303). Note that Step 303 may be considered to be somewhat of a continuation of Step 302 for the backward data migration, or the beginning of the forward data migration, which means more or equal amount of data in a stripe group will result from the data migration.

Next, a mirror copy of the data stripes that were backed up to the stripe backup buffer in the previous step is made on the same set of disks and in the last stripe spaces, in a RAID 6 like manner (Step 304). Then, data from the (each) stripe group that was copied and mirrored is migrated from the stripe source disk to the destination disk so that it is stored on the destination disks in its proper location given the particular RAID level (Step 305). The steps of copying, mirroring, and migrating (Steps 303 through 305) are repeated for each stripe group (referenced to the destination configuration) until all the stripe groups that are supposed to be in the destructive zone are migrated (Step 305). Finally, all the remaining stripe groups (that is the other stripe groups that are part of the data set stored in the RAID) for the case of Delta >0 are migrated at the normal rate by performing read and write operations and without the need to copy, mirror, or otherwise back up any more data first (Step 307). Normal rate refers to the rate allowed in a background task without the delay required to back up data first, as compared to the rate used for inclusion of a backup and mirroring of destructive zone data before data migration to destination.

EXAMPLES

We now describe several situations that illustrate the determination of the destructive zone using the above relationships. Each number indicated in the tables represents the data stripe number (hexadecimal) on the individual disk for the logical drive undergoing a RAID capacity extension and/or RAID level change. The letter "P" represents parity. The abbreviation "DZ" indicates a destructive zone. Each column represents a physical disk drive.

Example I

RAID 0 Capacity Expansion (3 disks to 4 disks)

In the first example, we illustrate a scenario in which a RAID 0 configuration is expanded from 3 disks to 4 disks, that is 1 disk is added to the RAID 0 configuration and the RAID level remains the same, relative to FIG. 6. FIG. 6A identifies stripes (stripe numbers), stripe groups, and physical disk drives in the original (or source) RAID configuration and in the new (or destination) RAID configuration. FIGS. 6B–6M illustrate intermediate stages of the configuration transformation during which data is migrated.

Using the formula to determine the value of Delta and the parameters applicable to this scenario, namely $N_{DD}=4$, $C_S=1$, $N_{SD}=3$, and $C_D=1$, we determine that Delta=(4×1)−(3×1)=1 which is greater than 0 and places us in a Case I situation. Furthermore, using the Case I equation, we calculate the destructive zone to be 3 stripe groups (DZ=3÷(1÷1)=3 stripe groups). In this description, we use the convention that stripe groups are counted and numbered with reference to the destination RAID configuration rather than relative to the source configuration. In this example, the destructive zone extends from stripe numbers "0" through "B" in the four disk RAID 0 destination configuration. Note that in the source configuration, four stripe groups numbered 0–3 are involved and contain the stripe data.

To back up each data stripe in the destructive zone before it is migrated, the RAID controller copies the data onto a buffer large enough to hold (store) the stripe unused by the user and located near the end of the physical volume of an available disk in a stripe group, advantageously the first available disk in a stripe group. The same data stripe is mirrored in an adjacent drive of the same group. The entire group so backed up is laid out in a RAID 6 or RAID 6 like configuration.

For a RAID 0 capacity expansion from 3 disks to 4 disks, and a total number of stripe groups in the new array is X, we assume for purposes of this description that stripe groups X–1 and X–2 are free if the stripe groups are numbered 1, 2, . . . X–1, X–1, X. Since delta is positive, the direction of this data migration is referred to as forward operation because the first data stripe (lowest numbered stripe) is migrated first.

With reference to FIG. 6B–6M, we now describe the manner in which data stripes in a destructive zone (DZ) are backed up before the data for that stripe group (SG) is migrated, using one or more backup buffers (BB) in the destination array located near the end of the physical disk volumes.

Pursuant to the data migration procedure 300 described above relative to FIG. 3, we first identify the number of stripe groups in the destructive zone (Step 301). In this example, there are three stripe groups in the destructive zone of the destination configuration. Next, we copy data stripes that will be in the first stripe group of the destructive zone onto: (1) an equal number of stripe backup buffers, each using free space near the end of the physical volume of the available disks (Step 303) and (2) their mirrored backup buffers. Note that the equal number of backup buffers corresponds to the number of data stripes in the stripe group. We then migrate the same data stripes to the destination array. This process continues for each stripe group that will be in the destructive zone. After migration of all data in the destructive zone is complete, then all subsequent stripes are migrated to the destination array one stripe group at a time without having to backup the data.

In this example, we first copy stripe group 0 including data stripe number 0 (from DISK1), data stripe number 1 (from DISK2), and data stripe number 2 (from DISK3) to a portion of stripe group X–2 which stripe group now spans four disks (DISK1, DISK2, DISK3, and DISK4). We also copy data stripe number 3 from DISK1 of stripe group 1 of the source, since this stripe number will become a member of the new destination stripe group 0 in the four disk configuration. It is noted that in this example, the number and identity of the stripes copied during this copying operation are a function of the destination. That is, since stripe numbers 0, 1, 2, and 3 form stripe group 0 in the destination configuration, these four stripes are copied (and then mirrored as described below). In the event of power outage, the affected stripe group in the destination array can be restored from the backup buffers residing in the same array, rather than partially from the source array. Note that the stripe backup buffer is defined to be in stripe groups X–2 and X–1).

Next, a mirror copy of the data stripes that were backed up to the stripe backup buffer in the previous step is made on the same set of disks and in the last stripe spaces, in a RAID 6 like manner (Step 304). In this example, data stripe numbers 0, 1, 2, and 3 are mirrored to another set of locations in the stripe backup buffer so that no mirror copy of a data item (stripe) is stored on the same physical disk as the original copy that was stored in the backup buffer. This provides the desired redundancy during the data migration.

Then, data from the (each) stripe group that was copied and mirrored is migrated from the source disks to the destination disk in its proper location given the particular RAID level (Step 305).

These steps (Steps 303–305 ) are repeated for each stripe group (referenced to the destination configuration) until all the stripe groups in the destructive zone are migrated (Step 306). Finally, all the remaining stripe groups (that is, all the other stripe groups that are part of the logical drive data stored in the RAID) are migrated at the normal rate by performing read and write operations and without the need to copy, mirror, or otherwise back up any more data first (Step 307).

Example II

Three-Disk RAID 0 to Three-Disk RAID 5 Configuration

In this second example, we migrate data from a three disk RAID 0 configuration to a three disk RAID 5 configuration. Delta is equal to $(N_{DD} \times C_S) - (N_{SD} \times C_D)$ or $(2 \times 1) - (3 \times 1) = -1$. Note that for the destination RAID 5 configuration there are three disks, however, only two of the disks are data disks, the third disk storing only parity data. The source RAID 0 configuration has three data disks. Both configurations have data copy count of 1. Because Delta is less than 0 (negative) the Destructive zone (in stripe groups) is equal to the destination data disk count divided by the absolute value of delta ($N_{DD}/|\text{Delta}| = 2/1$) or 2. The initial (source) and final (destination) configurations for data stripes as well as selected intermediate stages are illustrated in FIG. 7. With a negative Delta, the direction of data migration is backward; that, is, the last stripe migrates first. The contents of the data stripes in the source configuration and in the destination configuration are the same.

Example III

Three-Disk RAID 0 to Five-Disk RAID 5 Configuration

Figures 8A, 8B:

In this third example, we migrate data from a three disk RAID 0 configuration to a five disk RAID 5 configuration. Delta is equal to $(N_{DD} \times C_S) - (N_{SD} \times C_D)$ or $(4 \times 1) - (3 \times 1) = 1$. Note that for the destination RAID 5 configuration there are five disks, however, only four of the disks are data disks, the fifth disk storing only parity data. The source RAID 0 configuration has three data disks. Both configurations have data copy count factors of 1. Because Delta is greater than 0 (positive) the Destructive zone (in stripe groups) is equal to the source data disk count divided by the absolute value of delta divided by the source data copy count ($N_{DD}/|\text{Delta}| = 3/|1|$) or 3. The direction of data migration is forward—the first stripe migrated first. The initial (source), intermediate, and final (destination) configurations for data stripes are illustrated in FIG. 8.

Example IV

Three-Disk RAID 5 to Three-Disk RAID 6

In this fourth example, we migrate data from a three disk RAID 5 configuration to a three disk RAID 6 configuration. Delta is equal to $(N_{DD} \times C_S) - (N_{SD} \times C_D)$ or $(3 \times 1) - (2 \times 2) = -1$. Note that for the source RAID 5 configuration there are three disks, however, only two of the disks are data disks, the third disk storing only parity data. The destination RAID 6 configuration has three data disks. The RAID 5 configurations has a data copy count of 1 and the RAID 6 configuration has a data copy count of 2. Because Delta is less than 0 (negative) the Destructive zone (in stripe groups) is equal to the destination data disk count divided by the absolute value of delta ($N_{DD}/|Delta|=3/1$) or 3; however, since the destination configuration is a RAID 6 configuration entailing mirroring of the data, twice the number of stripe groups, six stripe groups or three stripe group pairs in this example, are in the destructive zone. The direction of data migration is backward—the last stripe migrated first. The initial (source) and final (destination) configurations for data stripes are illustrated in FIG. 9A

Example V

Three-Disk RAID 0 to Four-Disk RAID 5

Figures 10A, 10B, 10C:
FIGS. 10A–10C is a illustration showing aspects of a three-disk RAID 5 to four-disk RAID 5 migration.

In this fifth example, we migrate data from a three disk RAID 0 configuration to a four disk RAID 5 configuration. Delta is equal to $(N_{DD} \times C_S) - (N_{SD} \times C_D)$ or $(3 \times 1) - (3 \times 1) = 0$. Note that for the source RAID 0 configuration there are three data disks, and that the four disk RAID 5 destination configuration has three data disks and one parity disk. The RAID 5 configurations has redundancy factor of 1 and the RAID 0 configuration has a redundancy factor of 1. Because Delta is equal to 0, the Destructive zone (in stripe groups) includes all stripe groups of the entire logical drive. The initial (source) and final (destination) configurations for data stripes are illustrated in FIGS. 10A–C.

Additional Description

Tables I–III provide additional information concerning alternative embodiments and examples of the invention. In particular the information in Table I identifies exemplary RAID data migration flow directions and destructive zone size determination where the destination RAID has the same number of disks as the source RAID. Tables II and III provide analogous information where the destination disks are increased in number by 1 disk and by 2 disks respectively. These configurations are exemplary and those workers having ordinary skill in the art will appreciate that many other alternatives may be implemented.

It will also be appreciated that the inventive method may be implemented as a computer program executing in a general purpose computer and/or storage device controller having a processor and memory associated with the processor. For example, the inventive method may be implemented as computer software and/or firmware in a RAID controller.

TABLE I

Exemplary RAID Migration Flow Direction And Destructive Zone Size Determination for 0 Added Disks

| Source RAID | | Destination RAID + 0 Disks | | | |
|---|---|---|---|---|---|
| RAID Level | Total Disks | RAID Level | Total Disks | Delta | Destructive Zone Size |
| RAID 0 | 2 Disks | — | — | — | — |
| RAID 0 | 2 Disks | RAID 1 | 2 Disks | -2 | 1 |
| RAID 0 | 3 Disks | — | — | — | — |
| RAID 0 | 3 Disks | RAID 5 | 3 Disks | -1 | 2 |
| RAID 0 | 3 Disks | RAID 6 | 3 Disks | -3 | 1 |
| RAID 1 | 2 Disks | — | — | — | — |
| RAID 1 | 2 Disks | — | — | — | — |
| RAID 5 | 3 Disks | — | — | — | — |
| RAID 5 | 3 Disks | RAID 6 | 3 Disks | -1 | 3 |
| RAID 6 | 3 Disks | — | — | — | — |
| RAID 6 | 3 Disks | RAID 5 | 3 Disks | 1 | 6 |
| RAID 0 | 4 Disks | — | — | — | — |
| RAID 0 | 4 Disks | RAID 5 | 4 Disks | -1 | 3 |
| RAID 0 | 4 Disks | RAID 6 | 4 Disks | 4 | 1 |
| RAID 5 | 4 Disks | — | — | — | — |
| RAID 5 | 4 Disks | RAID 6 | 4 Disks | -2 | 2 |
| RAID 6 | 4 Disks | — | — | — | — |
| RAID 6 | 4 Disks | RAID 5 | 4 Disks | 2 | 4 |
| RAID 6 | 5 Disks | — | — | — | — |

Delta = (Destination Data Disk Count × Source Data Copy Count) − (Source Data disk Count × Destination Data Copy Count)
If Delta > 0, then Destructive Zone = Source Data Disk Count / | Delta / Source Data Copy Count |
If Delta < 0, then Destructive Zone (in Stripe Groups) = Destination Data Disk Count | Delta |
If Delta = 0, then Destructive Zone (in Stripe Groups) = All
Note:
1. If Delta >or = 0, migration goes top down (forward: first stripe first). If Delta <0, migration goes bottom up (backward; last stripe first)
2. Data Disk Count for RAID 5 is one less than the total disks used.
3. Data Copy Counts for RAID 0, RAID 1, RAID 5 and RAID 6 are 1,2,1 and 2, respectively
4. For RAID 6, Destructive Zone size calculated refers to Stripe Group Pairs.

TABLE II

Exemplary RAID Migration Flow Direction And Destructive Zone Size Determination for 1 Added Disk

| Source RAID | | Destination RAID + 1 Disks | | | |
|---|---|---|---|---|---|
| RAID Level | Total Disks | RAID Level | Total Disks | Delta | Destructive Zone Size |
| RAID 0 | 2 Disks | RAID 0 | 3 Disks | 1 | 2 |
| RAID 0 | 2 Disks | — | — | — | — |
| RAID 0 | 3 Disks | RAID 0 | 4 Disks | 1 | 3 |
| RAID 0 | 3 Disks | RAID 5 | 4 Disks | 0 | ALL |
| RAID 0 | 3 Disks | RAID 6 | 4 Disks | -2 | 2 |
| RAID 1 | 2 Disks | RAID 5 | 3 Disks | 2 | 2 |
| RAID 1 | 2 Disks | RAID 6 | 3 Disks | 2 | 2 |
| RAID 5 | 3 Disks | RAID 5 | 4 Disks | 1 | 2 |
| RAID 5 | 3 Disks | RAID 6 | 4 Disks | 0 | ALL |
| RAID 6 | 3 Disks | RAID 6 | 4 Disks | 2 | 3 |
| RAID 6 | 3 Disks | RAID 5 | 4 Disks | 3 | 2 |
| RAID 0 | 4 Disks | RAID 0 | 5 Disks | 1 | 4 |
| RAID 0 | 4 Disks | RAID 5 | 5 Disks | 0 | ALL |
| RAID 0 | 4 Disks | RAID 6 | 5 Disks | -3 | 2 |
| RAID 5 | 4 Disks | RAID 6 | 5 Disks | 1 | 3 |
| RAID 5 | 4 Disks | RAID 6 | 5 Disks | -1 | 5 |
| RAID 6 | 4 Disks | RAID 6 | 5 Disks | 2 | 4 |
| RAID 6 | 4 Disks | RAID 5 | 5 Disks | 4 | 2 |
| RAID 6 | 5 Disks | RAID 6 | 6 Disks | 2 | 5 |

Delta = (Destination Data Disk Count ×Source Data Copy Count) − (Source Data disk Count × Destination Data Copy Count)
If Delta > 0, then Destructive Zone = Source Data Disk Count / | Delta / Source Data Copy Count |
If Delta < 0, then Destructive Zone (in Stripe Groups) = Destination Data Disk Count | Delta |
If Delta = 0, then Destructive Zone (in Stripe Groups) = All
Note:
1. If Delta >or = 0, migration goes top down (forward: first stripe first). If Delta <0, migration goes bottom up (backward; last stripe first)
2. Data Disk Count for RAID 5 is one less than the total disks used.
3. Data Copy Counts for RAID 0, RAID 1, RAID 5 and RAID 6 are 1,2,1 and 2, respectively
4. For RAID 6, Destructive Zone size calculated refers to Stripe Group Pairs. Table III. Exemplary RAID Migration Flow Direction And Destructive Zone Size Determination for 2 Added Disks

TABLE III

Exemplary RAID Migration Flow Direction And Destructive Zone Size Determination for 2 Added Disks

| Source RAID | | Destination RAID + 2 Disks | | | |
| --- | --- | --- | --- | --- | --- |
| RAID Level | Total Disks | RAID Level | Total Disks | Delta | Destructive Zone Size |
| RAID 0 | 2 Disks | RAID 0 | 4 Disks | 2 | 1 |
| RAID 0 | 2 Disks | — | — | — | — |
| RAID 0 | 3 Disks | RAID 0 | 5 Disks | 2 | 2 |
| RAID 0 | 3 Disks | RAID 5 | 5 Disks | 1 | 3 |
| RAID 0 | 3 Disks | RAID 6 | 5 Disks | −1 | 5 |
| RAID 1 | 2 Disks | RAID 5 | 4 Disks | 4 | 1 |
| RAID 1 | 2 Disks | RAID 6 | 4 Disks | 4 | 1 |
| RAID 5 | 3 Disks | RAID 5 | 5 Disks | 2 | 1 |
| RAID 5 | 3 Disks | RAID 6 | 5 Disks | 1 | 2 |
| RAID 6 | 3 Disks | RAID 6 | 5 Disks | 4 | 2 |
| RAID 6 | 3 Disks | RAID 5 | 5 Disks | 5 | 2 |
| RAID 0 | 4 Disks | RAID 0 | 6 Disks | 2 | 2 |
| RAID 0 | 4 Disks | RAID 5 | 6 Disks | 2 | 4 |
| RAID 0 | 4 Disks | RAID 6 | 6 Disks | −2 | 3 |
| RAID 5 | 4 Disks | RAID 5 | 6 Disks | 2 | 2 |
| RAID 5 | 4 Disks | RAID 6 | 6 Disks | 0 | ALL |
| RAID 6 | 4 Disks | RAID 6 | 6 Disks | 4 | 2 |
| RAID 6 | 4 Disks | RAID 5 | 6 Disks | 6 | 2 |
| RAID 6 | 5 Disks | RAID 6 | 7 Disks | 4 | 3 |

Delta = (Destination Data Disk Count ×Source Data Copy Count) − (Source Data disk Count × Destination Data Copy Count)
If Delta > 0, then Destructive Zone = Source Data Disk Count / | Delta / Source Data Copy Count |
If Delta < 0, then Destructive Zone (in Stripe Groups) = Destination Data Disk Count | Delta |
If Delta = 0, then Destructive Zone (in Stripe Groups) = All
Note:
1. If Delta >or = 0, migration goes top down (forward: first stripe first). If Delta <0, migration goes bottom up (backward; last stripe first)
2. Data Disk Count for RAID 5 is one less than the total disks used.
3. Data Copy Counts for RAID 0, RAID 1, RAID 5 and RAID 6 are 1,2,1 and 2, respectively
4. For RAID 6, Destructive Zone size calculated refers to Stripe Group Pairs.

The foregoing description, for purposes of explanation, used specific nomenclature to provide a thorough understanding of the invention. However, it will be apparent to one skilled in the art that the specific details are not required in order to practice the invention. In other instances, well known circuits, devices, components, and the like are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

For example, though RAID configurations and disk drives have been used to describe the inventive system and method, the invention is not limited to either RAID system, drive based systems, disk-drive based RAID systems, or any particular RAID levels, either alone or in combination. Rather the inventive system, method, and when implemented as a computer program are more generally applicable to data movement in and among storage devices in a storage system. The storage system may be a locally constituted or it may be or include networked storage system and may be geographically diverse.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method for redistributing data among disks in a data storage system, said method comprising steps of:
   identifying the number of stripe groups in a destructive zone based on predefined factors;
   migrating all data before reaching the destructive zone from source disks to destination disks;
   copying all data that will be next to be in the stripe group of the destructive zone onto an equal number of backup buffer stripe buffers, each stripe using free space near the end of the physical volume of each disk;
   mirroring data stripes backed up in said copying all data step onto the same set of disks in the lower stripe group position of free space in the storage system;
   migrating data of the stripe group backed up in said mirroring step to destination disks from the source disks;
   repeating said steps of migrating, copying, and mirroring, until all data that will be in stripe groups in the destructive zone is migrated out of said destructive zone; and
   migrating all remaining data, if any, from said source disks onto said destination disks.

2. The method in claim 1, wherein said factors are selected from the group consisting of: the RAID redundancy factor before and after the data migration, a data copy count before and after the data migration, a number of data disks existing before and after data migration, an indicator indicating whether or not less data in a stripe group will result from the migration, and combinations thereof.

3. The method in claim 1, wherein said factors include a factor specifying that the data migration is to proceed in a forward or reverse direction.

4. The method in claim 1, wherein said factors include the data amount in a pair of stripe groups.

5. The method in claim 4, wherein said factors include the data amount in a pair of stripe groups for a RAID 6 configuration.

6. The method in claim 1, wherein in said step of migrating all data before reaching the destructive zone from source disks to destination disks is performed one stripe group at a time.

7. The method in claim 1, wherein in said step of migrating all data before reaching the destructive zone from source disks to destination disks is performed only for a backward (reverse) data migration.

8. The method in claim 1, wherein said step of copying all data is performed no sooner than its turn to migrate.

9. The method in claim 1, wherein in said step of mirroring, said data stripes are backed up in the lower stripe group position of free space in the array of said storage system.

10. The method in claim 9, wherein in said step of mirroring, said data stripes are backed up in the lower stripe group position of free space in the array of said storage system in a RAID 6 manner.

11. The method in claim 1, wherein in said step of migrating all remaining data from said source disks onto said destination disks, said migration is performed one stripe group at a time.

12. The method in claim 1, wherein in said step of migrating all remaining data from said source disks onto said destination disks, said migration is performed one stripe group at a time, without backing up any more data first.

13. The method in claim 1, wherein if is determined that less data in a stripe group or a stripe group pair will result from the migration, a backward data migration is performed which starts from the last stripe bearing the highest stripe number of the logical drive upward one stripe group at a time until the destructive zone is reached.

14. The method in claim 1, wherein if is determined that the same or more data in a stripe group or a stripe group pair will result from the migration, a forward data migration is performed in a direction from the first strip bearing the lowest stripe number of the logical drive downward through the destructive zone of the destination array.

15. A method for redistributing data in a data storage system, said method comprising:

identify data in a destructive zone;

migrating data before reaching the destructive zone from source storage devices to destination storage devices;

copying data onto a number of backup buffers;

mirroring data backed up in said copying step onto free space in the storage system;

migrating data backed up in said mirroring step to destination storage devices;

repeating said steps of migrating, copying, and mirroring, until data that will be in the destructive zone is migrated out of said destructive zone; and migrating remaining data from said source disks onto said destination disks.

16. The method in claim 15, wherein said storage devices comprise hard disk drives.

17. The method in claim 16, wherein said hard disk drives are organized into at least one RAID.

18. A computer program for use in conjunction with a computer system, the computer program comprising a computer program mechanism embedded therein, the computer program mechanism, comprising a program module that directs the migration of data among different portions of a data storage system, the program module including instructions for:

identifying the number of stripe groups in a destructive zone based on predefined factors;

migrating all data before reaching the destructive zone from source disks to destination disks;

copying all data that will be next to be in the stripe group of the destructive zone onto an equal number of backup buffer stripe buffers, each stripe using free space near the end of the physical volume of each disk;

mirroring data stripes backed up in said copying all data step onto the same set of disks in the lower stripe group position of free space in the storage system;

migrating data of the stripe group backed up in said mirroring step to destination disks from the source disks;

repeating said steps of migrating, copying, and mirroring, until all data that will be in stripe groups in the destructive zone is migrated out of said destructive zone; and migrating all remaining data, if any, from said source disks onto said destination disks.

19. A controller for a data storage system having a plurality of separately addressable storage portions, said controller comprising:

a processor;

a memory coupled to said processor;

at least one interface coupling said data storage system to said processor;

data migration means for redistributing data amount different ones of said plurality of separately addressable storage portions; wherein said data migration means comprises a computer program executing in said processor, said computer program comprising a computer program mechanism embedded therein, the computer program mechanism, comprising a program module that directs the migration of data amount different portions of a data storage system, the program module including instructions for:

identifying the number of stripe groups in a destructive zone based on predefined factors;

migrating all data before reaching the destructive zone from source disks to destination disks;

copying all data that will be next to be in the stripe group of the destructive zone onto an equal number of backup buffer stripe buffers, each stripe using free space near the end of the physical volume of each disk;

mirroring data stripes backed up in said copying all data step onto the same set of disks in the lower stripe group position of free space in the storage system;

migrating data of the stripe group backed up in said mirroring step to destination disks from the source disks;

repeating said steps of migrating, copying, and mirroring, until all data that will be in stripe groups in the destructive zone is migrated out of said destructive zone; and migrating all remaining data, if any from said source disks onto said destination disks.

20. The controller in claim 19, wherein said data storage system comprises a RAID data storage system having a plurality of hard disk drives.

* * * * *